(12) United States Patent
Yamaguchi et al.

(10) Patent No.: US 8,506,432 B2
(45) Date of Patent: Aug. 13, 2013

(54) BELT TYPE STEPLESS TRANSMISSION AND PULLEY FOR THE SAME

(75) Inventors: Kenichi Yamaguchi, Chiryu (JP); Ichiro Aoto, Toyota (JP); Ichiro Tarutani, Owariasahi (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 92 days.

(21) Appl. No.: 12/809,504

(22) PCT Filed: Dec. 19, 2008

(86) PCT No.: PCT/JP2008/073230
§ 371 (c)(1),
(2), (4) Date: Jun. 18, 2010

(87) PCT Pub. No.: WO2009/081875
PCT Pub. Date: Jul. 2, 2009

(65) Prior Publication Data
US 2011/0039644 A1    Feb. 17, 2011

(30) Foreign Application Priority Data
Dec. 21, 2007  (JP) ................ 2007-329790

(51) Int. Cl.
*F16H 55/56*  (2006.01)
(52) U.S. Cl.
USPC ........................................... 474/8
(58) Field of Classification Search
USPC ................................. 474/8–11, 18, 28
See application file for complete search history.

(56) References Cited

U.S. PATENT DOCUMENTS

| 1,637,402 | A | | 8/1927 | Abbott | |
|---|---|---|---|---|---|
| 3,534,622 | A | * | 10/1970 | Johnson | 474/12 |
| 5,013,283 | A | * | 5/1991 | d'Herripon | 474/8 |
| 6,648,781 | B1 | * | 11/2003 | Fischer et al. | 474/8 |
| 6,926,631 | B2 | * | 8/2005 | Brandsma et al. | 474/8 |
| 7,798,930 | B2 | * | 9/2010 | Nojiri | 474/93 |
| 2003/0096668 | A1 | | 5/2003 | Yoshida et al. | |

FOREIGN PATENT DOCUMENTS

| CN | 1420293 A | 5/2003 |
|---|---|---|
| DE | 22 00 569 B1 | 7/1973 |
| DE | 30 48 161 A1 | 9/1981 |

(Continued)

OTHER PUBLICATIONS

Supplementary European Search Report dated Apr. 26, 2011, corresponding to European Application No. 08865692.1.

(Continued)

*Primary Examiner* — William E Dondero
*Assistant Examiner* — Mark K Buse
(74) *Attorney, Agent, or Firm* — Sughrue Mion, PLLC

(57) ABSTRACT

A stationary pulley (66) includes a pressing pulley (68) having a stationary pulley surface (66*a*) and also includes a support pulley (70) having a rotating shaft (15) fixed to the center section of the support pulley. The support pulley (70) is placed so as to face a movable pulley surface (14*a*) across the pressing pulley (68) in the direction of the axis of the rotating shaft (15), and the support pulley (70) supports an outer peripheral section (68*b*) of the pressing pulley (68) so as to restrain axial movement of the outer peripheral section (68*b*). The pressing pulley (68) has an inner peripheral section (68*c*) axially movable relative to the rotating shaft (15) and can transmit torque to the rotating shaft (15).

5 Claims, 17 Drawing Sheets

(56) References Cited

FOREIGN PATENT DOCUMENTS

| | | |
|---|---|---|
| DE | 43 42 736 A1 | 6/1995 |
| JP | 1-63860 U | 4/1989 |
| JP | 2000-337480 A | 12/2000 |
| JP | 2002-106659 A | 4/2002 |

OTHER PUBLICATIONS

Chinese Office Action issued Jul. 3, 2012 for corresponding Application No. 200880120030.9.

* cited by examiner

BELT TYPE STEPLESS TRANSMISSION AND PULLEY FOR THE SAME

CROSS REFERENCE TO RELATED APPLICATIONS

This application is a National Stage of International Application No. PCT/JP2008/073230 filed Dec. 19, 2008, claiming priority based on Japanese Patent Application No. 2007-329790, filed Dec. 21, 2007, the contents of all of which are incorporated herein by reference in their entirety.

TECHNICAL FIELD

The present invention relates to a pulley, and to a belt-type stepless transmission with a belt wound around the pulley.

BACKGROUND ART

Related art of this type of belt-type stepless transmission is disclosed in Patent Document 1 mentioned below. A belt-type stepless transmission disclosed in Patent Document 1 includes a primary pulley provided on a driving rotating shaft and a secondary pulley provided on a follower rotating shaft, in which a belt is wound around both pulleys. A rotating shaft comprises a first shaft portion being integral with a first flange portion having a cone surface and a second shaft portion being integral with a second flange portion which forms, integrally with the first flange portion, a stationary pulley and having a hollow hole. A first axis attachment end surface is formed on the first shaft portion, a second axis attachment end surface is formed on the second shaft portion, an attachment ring surface is formed on the first flange portion, and an attachment ring surface is formed on the second flange portion, these being joined by means of friction welding. With the above, the weight of the shift having pulleys is reduced while ensuring sufficient rigidity.

Patent Document 1: JP 2002-106659

DISCLOSURE OF INVENTION

Technical Problem

According to Patent Document 1, as the inside peripheral portion of the stationary pulley is fixed to the rotating shaft, the stationary pulley is deformed, when holding a belt by pressing, in a manner similar to that in which a disk fixed at the center thereof is deformed. Thus, axial directional displacement of the stationary pulley when holding a belt by pressing tends to be smaller in an inside peripheral portion with a shorter radius and larger in an outside peripheral portion with a longer radius. As a result, the belt and the pulley tend to contact each other with greater force on inside portions thereof in the diameter direction than on outside portions (lower-portion-abutting). A belt and a pulley contacting in a lower-portion-abutting manner may cause increase of noise and vibration, abrasion of the belt, and deterioration of driveline efficiency.

The present invention aims to provide a belt-type stepless transmission and a pulley thereof capable of restraining the belt and the pulley from contacting each other in a lower-portion-abutting manner.

Means for Solving the Problem

A belt-type stepless transmission according to the present invention includes a pulley of a belt-type stepless transmission, comprising a stationary pulley having a stationary cone surface and a rotating shaft fixed at a central portion thereof; a movable pulley being movable in an axial direction of the rotating shaft and having a movable cone surface disposed facing the stationary cone surface in the axial direction; and a belt held between, while being pressed by, the stationary cone surface and the movable cone surface, wherein the stationary pulley includes a pressing pulley having the stationary cone surface, and a support pulley disposed facing the movable cone surface with the pressing pulley in between in the axial direction, for supporting the pressing pulley, in which the rotating shaft is fixed at a central portion thereof, the support pulley supports an outside peripheral portion of the pressing pulley so as to restrain axial directional displacement of the outside peripheral portion of the pressing pulley, and the pressing pulley has an inside peripheral portion capable of moving in the axial directional relative to the rotating shaft and transmission of a torque to any one or more of the rotating shaft and the support pulley.

According to one aspect of the present invention, preferably, a first torque-transmitting mechanism may be provided for restraining rotational directional displacement of the inside peripheral portion of the pressing pulley relative to the rotating shaft, while tolerating axial directional displacement of the inside peripheral portion of the pressing pulley relative to the rotating shaft, to transmit a torque between the pressing pulley and the rotating shaft.

According to one aspect of the present invention, preferably, a space may be formed between the inside peripheral portion of the pressing pulley and the rotating shaft.

According to one aspect of the present invention, preferably, a second torque-transmitting mechanism may be provided for restraining rotational directional displacement of the outside peripheral portion of the pressing pulley relative to the support pulley to transmit a torque between the pressing pulley and the support pulley.

According to one aspect of the present invention, preferably, the outside peripheral portion of the pressing pulley may be attached to the support pulley.

According to one aspect of the present invention, preferably, a space may be formed between the inside peripheral portion of the pressing pulley and the support pulley.

A belt-type stepless transmission according to the present invention is a belt-type stepless transmission comprising a belt wound around a pulley, wherein the pulley is a pulley of the belt-type stepless transmission according to the present invention.

Advantageous Effects of the Invention

According to the present invention, as an outside peripheral portion of the pressing pulley is supported by the support pulley so as to restrain axial directional displacement of the outside peripheral portion of the pressing pulley, and the inside peripheral portion of the pressing pulley is able to move in the axial direction of the rotating shaft, it is possible to prevent the belt and the pulley from contacting each other in a lower-portion-abutting manner (a state of contact in which the inside portion in the diameter direction contacts with greater force than the outside portion in the diameter direction).

Figure 1:
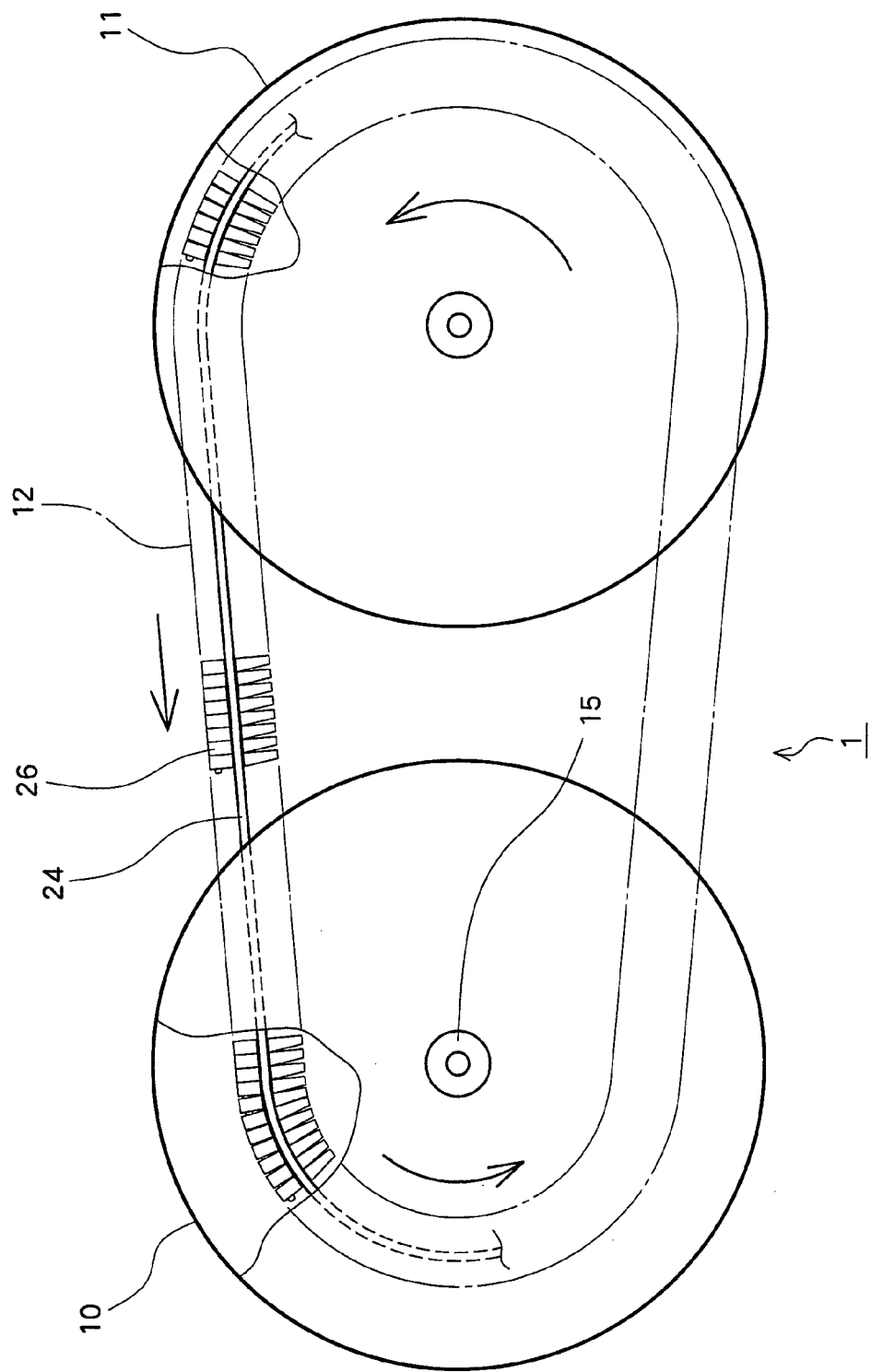
FIG. 1 is a diagram schematically showing a basic structure of a belt-type stepless transmission having pulleys.

DESCRIPTION OF REFERENCE NUMERALS 1 belt-type stepless transmission, 10 drive pulley, 11 follower pulley, 12 endless belt, 14 movable pulley, 14a movable pulley surface, 15 rotating shaft, 16, 66 stationary pulley, 16a, 66a stationary pulley surface, 24 endless band, 26 element, 26a side surface, 68 pressing pulley, 68a back surface, 68b, 70b outside peripheral portion, 68c, 70c inside peripheral portion, 70 support pulley, 72, 74 space, 78, 80 tooth, 88, 90 spline.

BEST MODE FOR CARRYING OUT THE INVENTION

Figure 2:
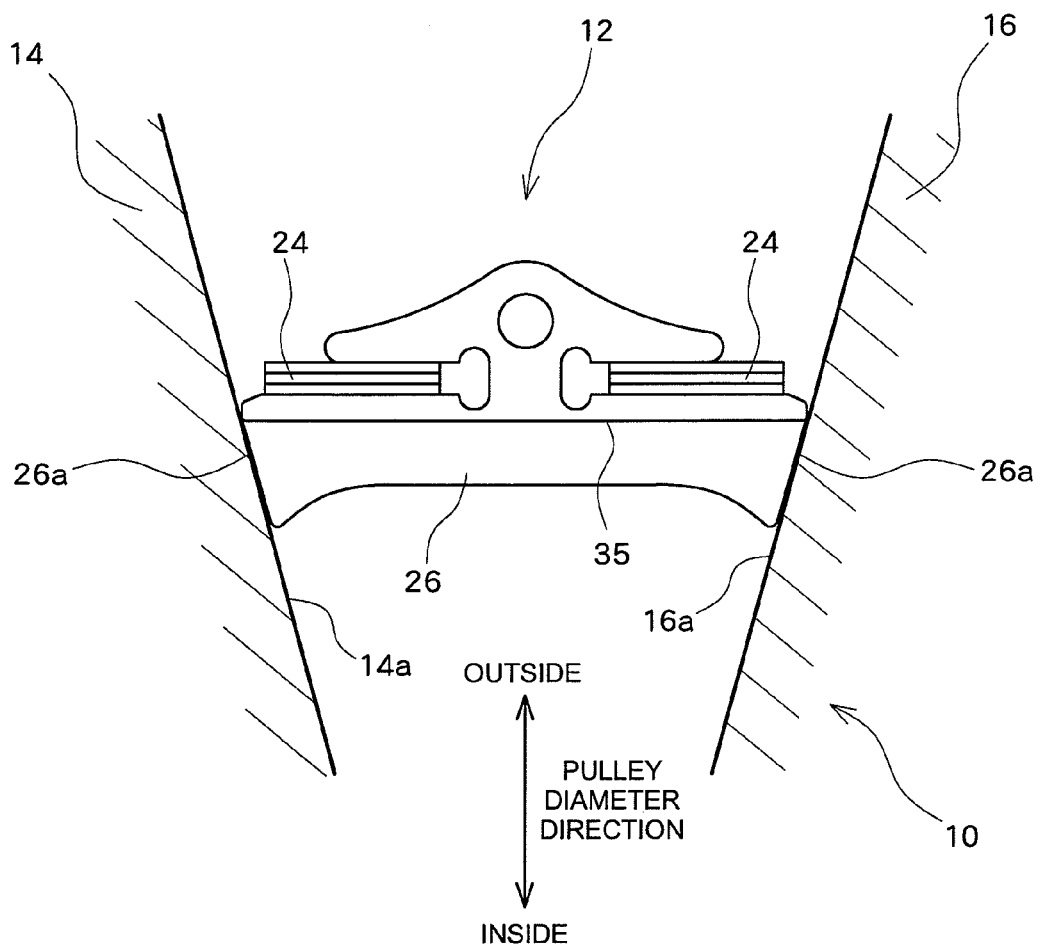
FIG. 2 is a diagram schematically showing a basic structure of a belt-type stepless transmission having pulleys.
Figure 3:
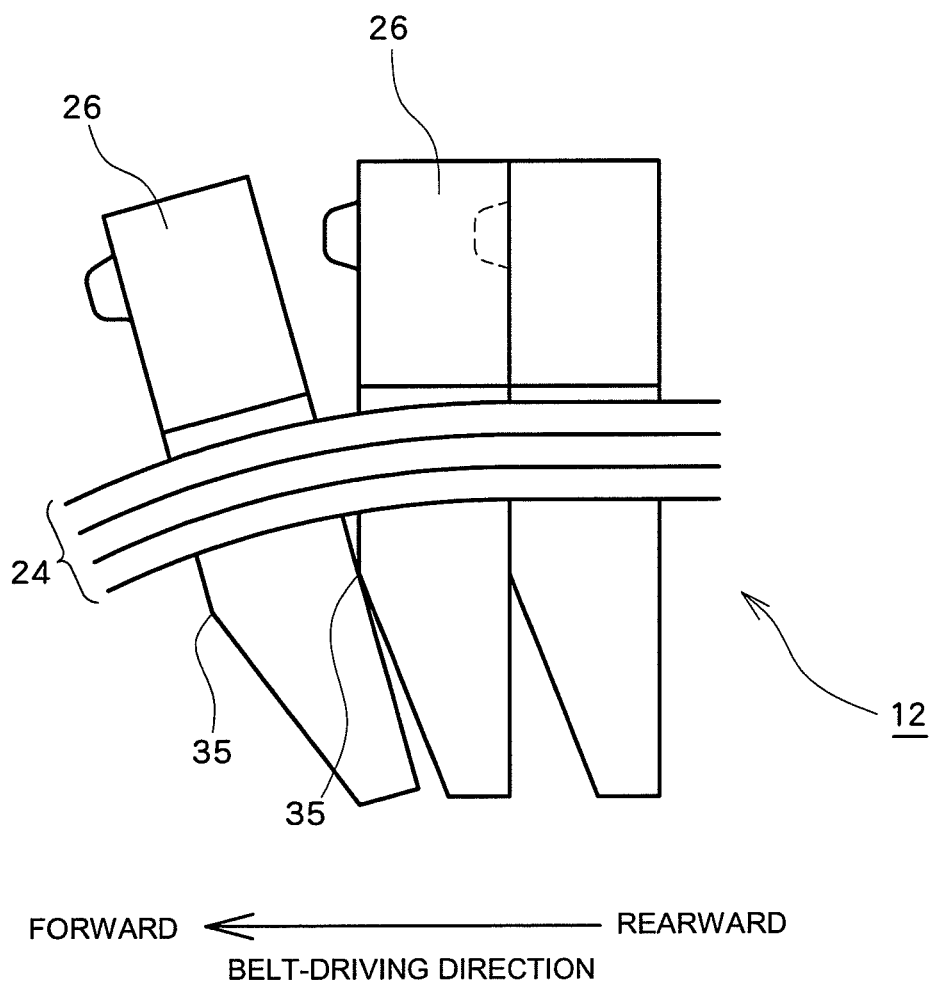
FIG. 3 is a diagram schematically showing a basic structure of a belt-type stepless transmission having pulleys.
Figure 4:
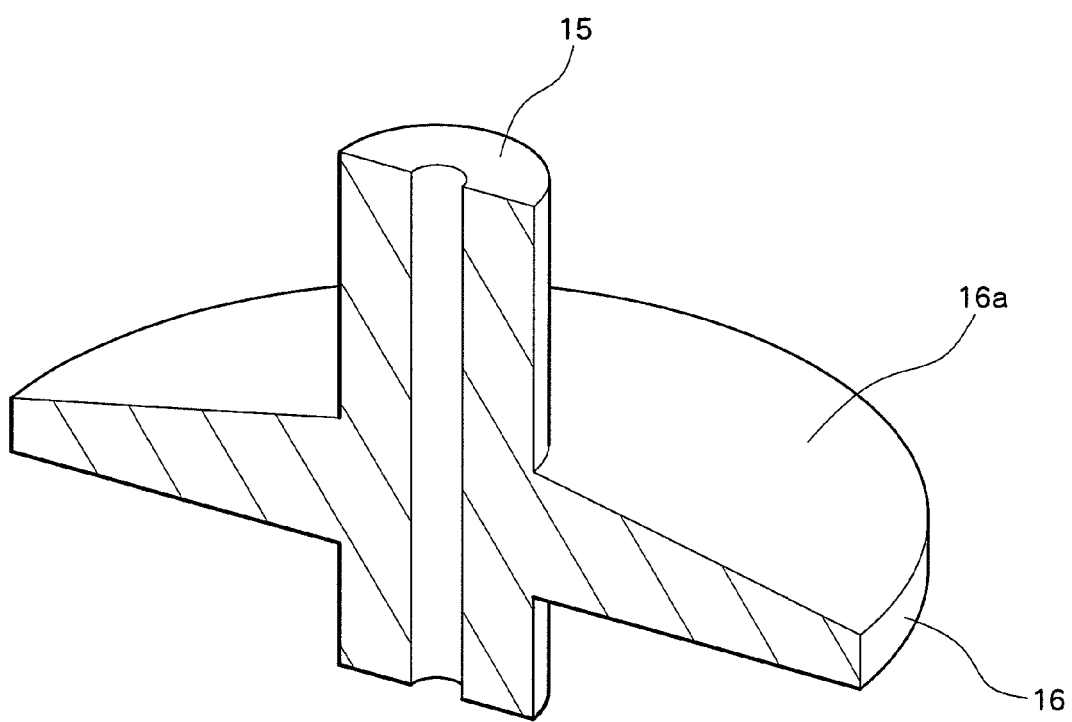
FIG. 4 is a diagram schematically showing a basic structure of a pulley of a belt-type stepless transmission having pulleys.

In the following, a preferred embodiment of the present invention will be described with reference to the accompanying drawings Basic Structure FIGS. 1 to 4 are diagrams schematically showing a basic structure of a belt-type stepless transmission 1 having pulleys. FIG. 1 shows a schematic structure of the belt-type stepless transmission 1 as viewed from a direction in parallel to the axial direction of a rotating shaft 15 of a pulley; FIG. 2 shows a part of a structure of the belt-type stepless transmission 1 as viewed from a direction perpendicular to the axial direction of the rotating shaft 15 of the pulley; FIG. 3 shows a part of a structure of an endless belt 12 as viewed from a direction in parallel to the axial direction of the rotating shaft 15 of the pulley; and FIG. 4 is a cutaway perspective view of a structure of a stationary pulley 16. In FIG. 4, the rotating shaft 15 and the stationary pulley 16 are shown in a halved state. In the belt-type stepless transmission 1, the endless belt 12 for transmitting a driving force is wound around a drive pulley (a primary pulley) 10 and a follower pulley (a secondary pulley) 11 so that rotation of the drive pulley 10 is transmitted via the endless belt 12 to the follower pulley 11.

The drive pulley 10 comprises the stationary pulley 16 having the rotating shaft 15 fixed at the central portion thereof, and a movable pulley 14 capable of moving in the axial direction of the rotating shaft 15 (hereinafter simply referred to as an axial direction). A stationary pulley surface 16a of the stationary pulley 16 is disposed facing a movable pulley surface 14a of the movable pulley 14 in the axial direction, and the endless belt 12 is held between the stationary pulley surface 16a and the movable pulley surface 14a by being pressed by the stationary pulley surface 16a and the movable pulley surface 14a for transmission of a torque via the endless belt 12. Each of the stationary pulley surface 16a and the movable pulley surface 14a is a cone surface which is oriented oblique to the pulley diameter direction, and the interval between the pulley surfaces 14a and 16a becomes smaller while moving inward in the pulley diameter direction (that is, becomes larger while moving outward in the pulley diameter direction). Note that the follower pulley 11 has a structure similar to that of the drive pulley 10, comprising a stationary pulley 16 and a movable pulley 14.

The endless belt 12 comprises a pair of endless bands (stacked bands) 24, and a plurality of elements 26 arranged and supported along the circumferential direction of the pair of endless bands 24. As the drive pulley 10 rotates and the endless belt 12 is thereby driven, the respective elements 26 contact, on the side surfaces 26a thereof, the movable pulley surface 14a and the stationary pulley surface 16a and are thereby held between the movable pulley surface 14a and the stationary pulley surface 16a while being pressed. As the lower part of each element 26 (inside in the pulley diameter direction) becomes gradually thinner, as shown in FIG. 3, a rocking edge 35 is formed on each element 26 so as to be opposed to the adjacent element 26 located ahead of the element 26 in the belt-driving direction (one side of a belt driving direction). The rocking edge 35 of each element 26 is formed extending across the width direction of the element 26. Each element 26 can rock (pitching), using as a fulcrum the rocking edge 35 of the adjacent element 26 located behind the element 26 in the belt-driving direction (the other side of the belt-driving direction).

A thrust force in the axial direction is applied to the movable pulley 14 by hydraulic pressure supplied. As the movable pulley 14 moves in the axial direction by the thrust force, the interval between the movable pulley surface 14a and the stationary pulley surface 16a varies. Accordingly, the endless belt 12 slides in the pulley diameter direction relative to the pulley surfaces 14a and 16a. With the endless belt 12 sliding in the pulley diameter direction, the belt-winding diameter of the endless belt 12 on the drive pulley 10 and the follower pulley 11 varies continuously so that the speed ratio of the belt type stepless transmission 1 also varies continuously.

Embodiment

Figure 5:
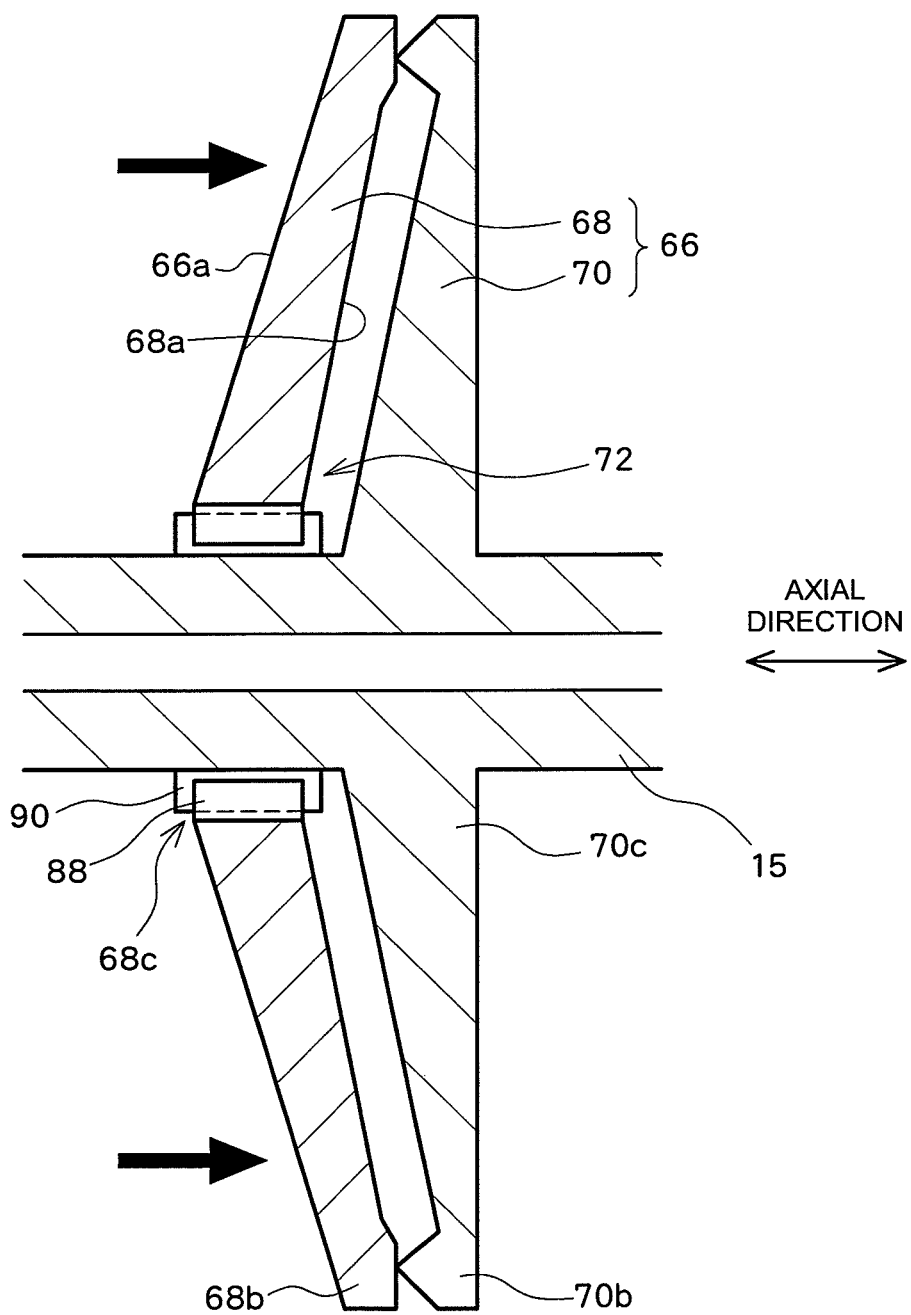
FIG. 5 is a diagram showing a schematic structure of a pulley of a belt-type stepless transmission according to an embodiment of the present invention.
Figure 6:
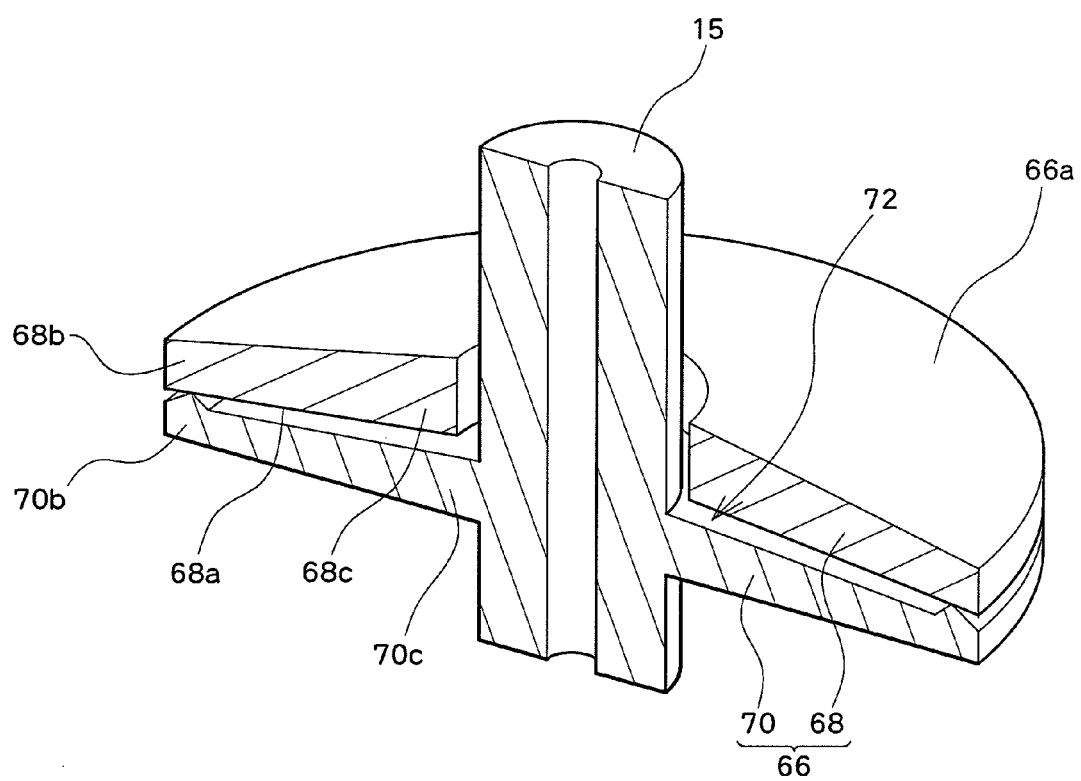
FIG. 6 is a diagram showing a schematic structure of a pulley of a belt-type stepless transmission according to an embodiment of the present invention.

FIGS. 5 and 6 are diagrams showing a schematic structure of a pulley of a belt-type stepless transmission according to an embodiment of the present invention, specifically showing a schematic structure of a stationary pulley 66. FIG. 5 is a diagram showing a schematic structure of the stationary pulley 66 as viewed from a direction perpendicular to the axial direction; FIG. 6 is a perspective cutaway view showing a part of a structure of the stationary pulley 66. In FIG. 6, the rotating shaft 15 and the stationary pulley 66 are shown in a halved state. By substituting the stationary pulley 16 in the basic structure shown in FIGS. 1 to 4 with the stationary pulley 66 having a structure to be described below, a belt-type stepless transmission having pulleys according to this embodiment can be realized. In this case, the stationary pulley 16 of the drive pulley 10 may be substituted by the stationary pulley 66, or the stationary pulley 16 of the follower pulley 11 may be substituted by the stationary pulley 66, or the stationary pulleys 16 of the drive pulley 10 and the follower pulley 11 may both be substituted by the stationary pulleys 66. Note that in the following description like members or members corresponding to those in the basic structure shown in FIGS. 1 to 4 are assigned identical reference numerals, with descriptions thereof not repeated.

The stationary pulley 66 comprises a pressing pulley 68 having a stationary pulley surface 66a, and a support pulley 70 for supporting the pressing pulley 68. Similar to the stationary pulley surface 16a, the stationary pulley surface 66a is a cone surface oriented oblique to the pulley diameter direction, disposed facing the movable pulley surface 14a in the axial direction and such that the interval with respect to the movable pulley surface 14a becomes smaller while moving inward in the pulley diameter direction. The endless belt 12 (element 26) is held between, while being pressed by, the stationary pulley surface 66a and the movable pulley surface 14a. The support pulley 70 is disposed facing the movable pulley surface 14a with the pressing pulley 68 therebetween in the axial direction, and supports the pressing pulley 68 (the surface opposite from the stationary pulley surface 66a) by abutting the back surface 68a of the pressing pulley 68. A rotating shaft 15 is fixed at the central portion of the support pulley 70. The support pulley 70 and the rotating shaft 15 may be formed as either an integral component or separate components to be formed integral later by inserting with pressure or the like.

In this embodiment, the outside peripheral portion 70b of the support pulley 70 abuts the outside peripheral portion 68b of the pressing pulley 68 (back surface 68a), whereby the support pulley 70 supports, on the outside peripheral portion 70b, the outside peripheral portion 68b of the pressing pulley 68 so as to restrain axial directional displacement of the outside peripheral portion 68b of the pressing pulley 68 (stationary pulley surface 66a). A space 72 is formed between the inside peripheral portion 70c of the support pulley 70 and the inside peripheral portion 68c of the pressing pulley 68 (back surface 68a). That is, the support pulley 70 does not support the inside peripheral portion 68c of the pressing pulley 68 (that is, axial directional displacement of the inside peripheral portion 68c is not restrained).

In the example shown in FIGS. 5 and 6, the space 72 is formed between the pressing pulley 68 and the support pulley 70 except between the outside peripheral portions 68b and 70b. Further, a spline (tooth) 88 is formed on the inside peripheral portion 68c of the pressing pulley 68 such that the tooth width direction thereof coincides (or substantially coincides) with the axial direction, projecting toward the rotating shaft 15. Meanwhile, a spline (tooth) 90 is formed on the outside peripheral portion of the rotating shaft 15 such that the tooth width direction thereof coincides (or substantially coincides) with the axial direction, projecting toward the inside peripheral portion 68c of the pressing pulley 68. With the spline 88 of the pressing pulley 68 and the spline 90 of the rotating shaft 15 being meshed with each other, the inside peripheral portion 68c of the pressing pulley 68 and the rotating shaft 15 are engaged with each other in the rotational direction, whereby rotational directional displacement (relative displacement) of the inside peripheral portion 68c of the pressing pulley 68 relative to the rotating shaft 15 is restrained. This enables transmission of a torque between the pressing pulley 68 and the rotating shaft 15, so that the pressing pulley 68, the rotating shaft 15, and the support pulley 70 can rotate integrally.

Meanwhile, as axial directional displacement (relative displacement) of the spline 88 relative to the spline 90 is tolerated, the rotating shaft 15 does not restrain axial directional displacement of the inside peripheral portion 68c of the pressing pulley 68, so that axial directional displacement (relative displacement) of the inside peripheral portion 68c of the pressing pulley 68 relative to the rotating shaft 15 is tolerated. As described above, the mutually meshed (engaged) splines 88 and 90 function as a torque-transmitting mechanism (engaging mechanism), and rotational directional relative displacement of the inside peripheral portion 68c of the pressing pulley 68 relative to the rotating shaft 15 is restrained, while axial directional relative displacement relative to the rotating shaft 15 is possible.

When the endless belt 12 (element 26) is held between, while being pressed by, the stationary pulley surface 66a and the movable pulley surface 14a, the pressing pulley 68 tends to move in the axial direction (toward the support pulley 70) while receiving a thrust force toward the support pulley 70 from the element 26. The support pulley 70 receives, on the outside peripheral portion 70b thereof, a thrust force from the pressing pulley 68 and supports the outside peripheral portion 68b of the pressing pulley 68 to thereby suppress the amount of axial directional displacement of the pressing pulley 68 to a finite amount (or range).

Figure 7:
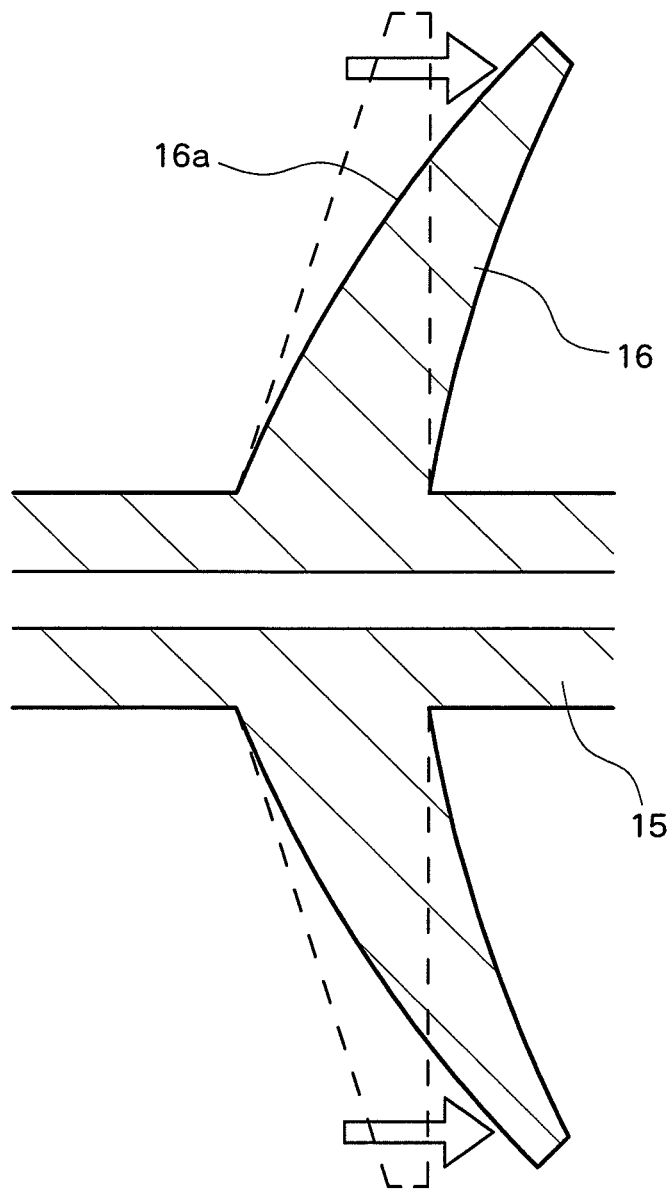
FIG. 7 is a diagram showing a stationary pulley 16 deformed with a load applied from an element 26 to an outside peripheral portion of the stationary pulley surface 16a in a basic structure.
Figure 8:
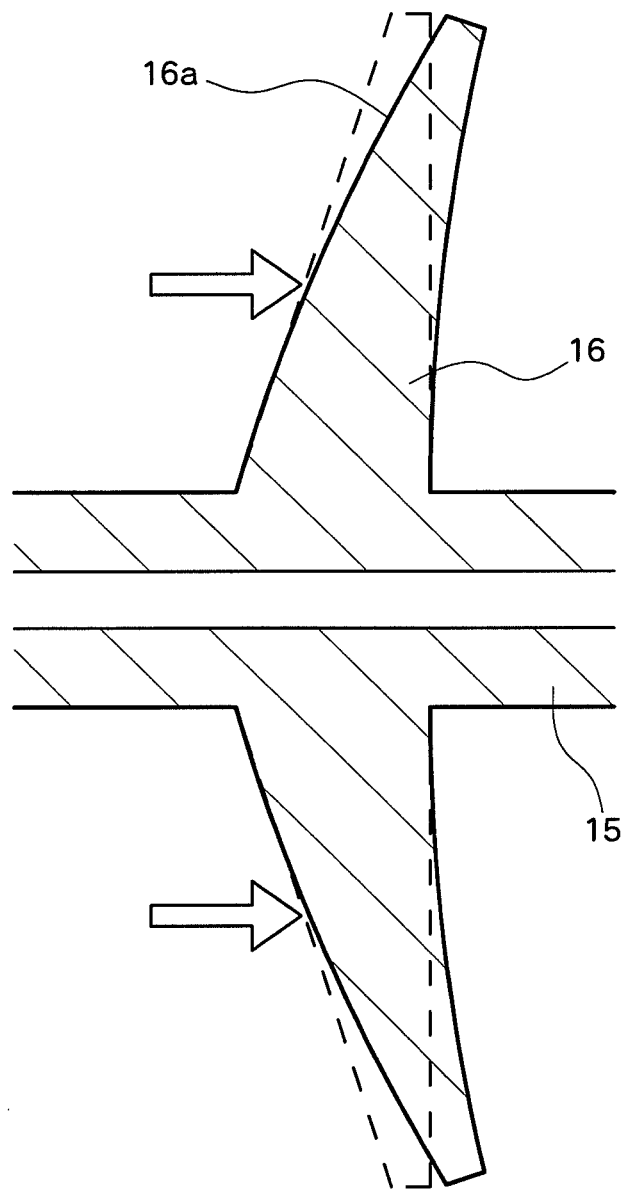
FIG. 8 is a diagram showing the stationary pulley 16 deformed with a load applied from the element 26 to a central portion of the stationary pulley surface 16a in a basic structure.
Figure 9:
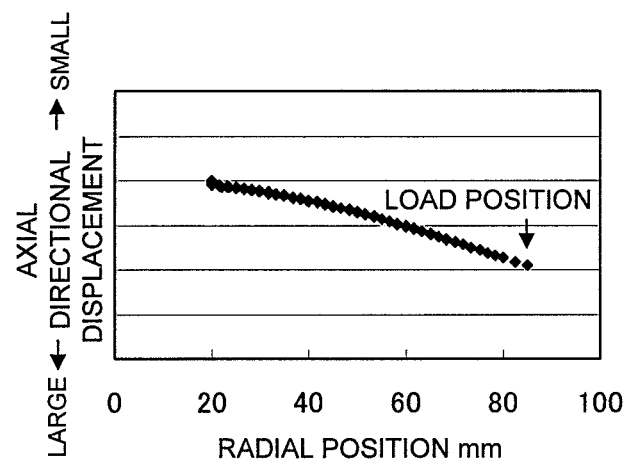
FIG. 9 is a diagram showing a calculation result of an axial directional displacement of the stationary pulley surface 16a with a load applied from the element 26 to an outside peripheral portion of the stationary pulley surface 16a in a basic structure.
Figure 10:
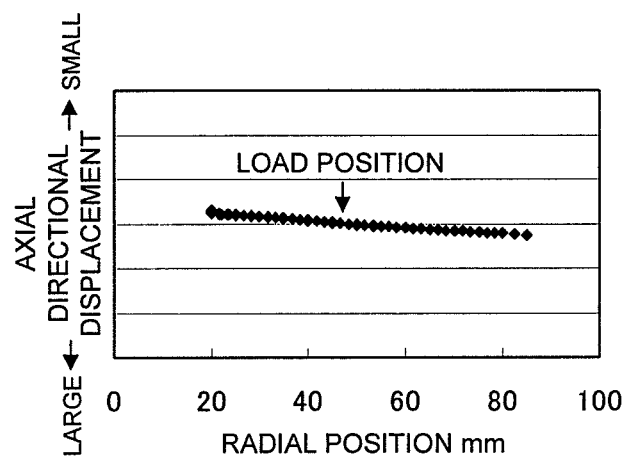
FIG. 10 is a diagram showing a calculation result of an axial directional displacement of the stationary pulley surface 16a with a load applied from the element 26 to a central portion of the stationary pulley surface 16a in a basic structure.

In the basic structure shown in FIGS. 1 to 4, as the inside peripheral portion of the stationary pulley 16 is fixed to the rotating shaft 15, the stationary pulley 16 is deformed, when holding the endless belt 12 (element 26) by pressing, in a manner similar to that in which a disk fixed at the central portion thereof is deformed, as shown in FIGS. 7 and 8. Here, FIG. 7 shows the stationary pulley 16 being deformed when the element 26 is in contact with an outside peripheral portion of the stationary pulley surface 16*a* and a load from the element 26 is applied to the outside peripheral portion of the stationary pulley surface 16*a*; and FIG. 8 shows the stationary pulley 16 being deformed when the element 26 is in contact with a central portion of the stationary pulley surface 16*a* and a load from the element 26 is applied to the central portion of the stationary pulley surface 16*a*. In the above, as shown in FIGS. 9 and 10, axial directional displacement of the stationary pulley 16 (stationary pulley surface 16*a*) tends to be smaller in an inside peripheral portion with a shorter radius and larger in an outside peripheral portion with a longer radius. FIG. 9 shows a result of calculation of an axial directional displacement of the stationary pulley surface 16*a* when a load from the element 26 is applied to an outside peripheral portion of the stationary pulley surface 16*a*; and FIG. 10 shows a result of calculation of an axial directional displacement of the stationary pulley surface 16*a* when a load from the element 26 is applied to a central portion of the stationary pulley surface 16*a*.

Figure 11:
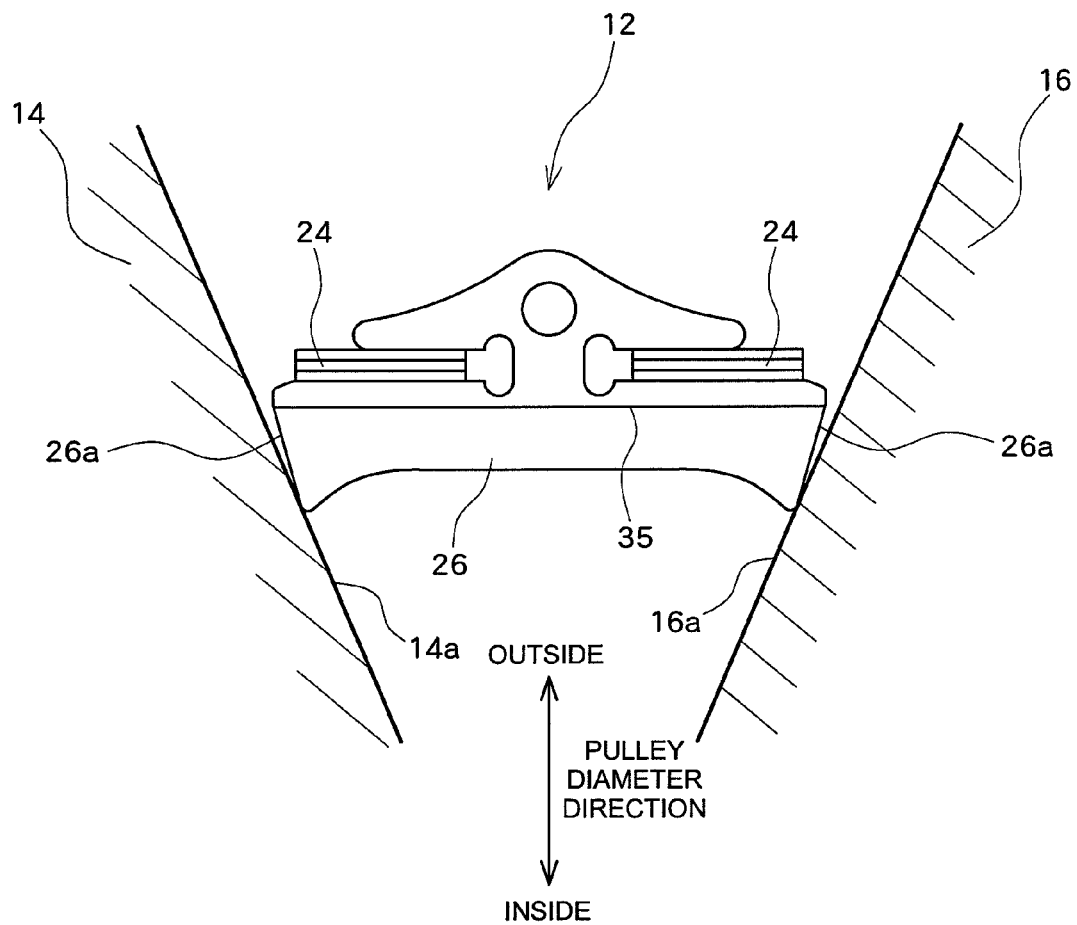
FIG. 11 is a diagram explaining the element 26 and the pulley surfaces 14a and 16a contacting in a lower-portion-abutting manner in a basic structure.

Plane pressure between the side surface 26*a* of the element 26 and the respective pulley surfaces 14*a*, 16*a* tends to be higher inside in the diameter direction and lower outside in the diameter direction. That is, the element 26 and the pulley surfaces 14*a* and 16*a* tend to contact each other in a lower-portion-abutting manner in which inside portions thereof in the pulley diameter direction contact with greater force than do outside portions, as shown in FIG. 11. In particular, the further outward a position where the element 26 contacts the pulley surfaces 14*a* and 16*a*, the greater the contact force between the lower portion of the element 26 and the pulley surfaces 14*a* and 16*a*. As the lower portion (inside in the pulley diameter direction) of the element 26 is thinner in panel width and thus has lower rigidity as compared with the upper portion (outside in the pulley diameter direction), the element 26 tends to deform by a greater amount when the element contacts the pulley surfaces 14*a* and 16*a* in a lower-portion-abutting manner.

Figure 12:
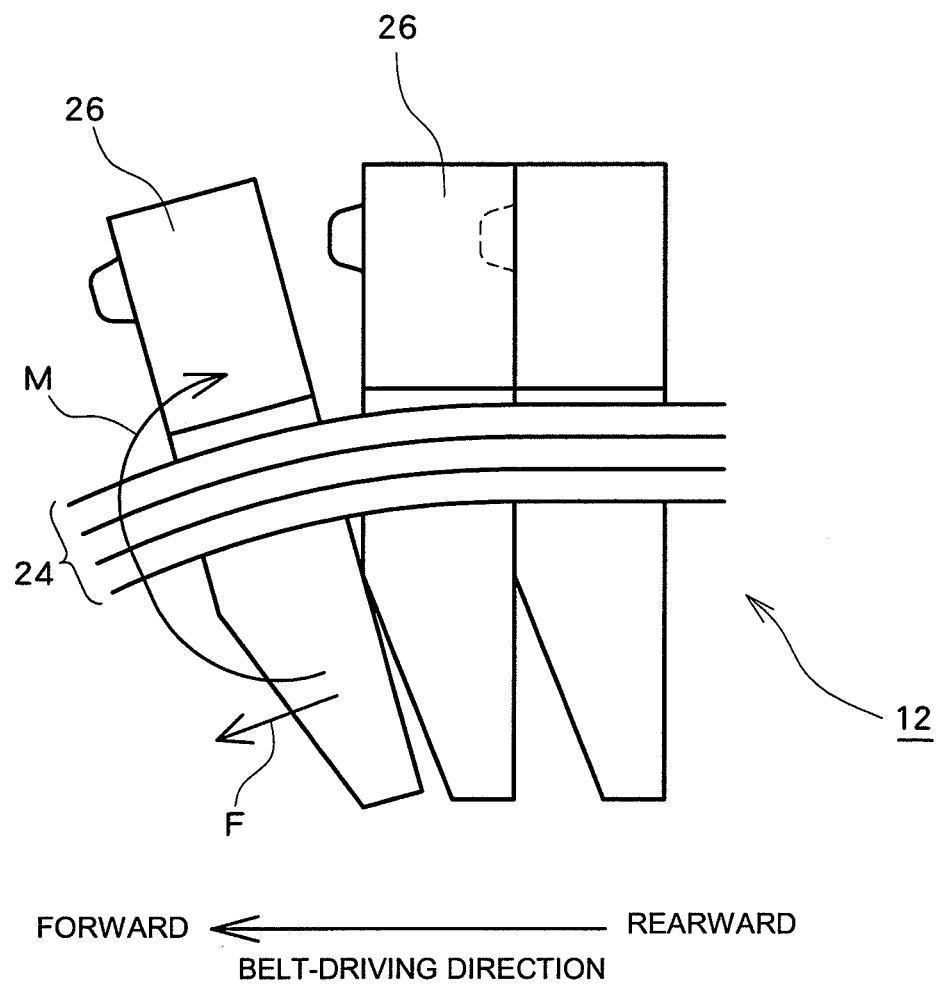
FIG. 12 is a diagram explaining a moment in an obliquely rearward direction applied to the element 26 in a basic structure.

Further, with the element 26 and the pulley surfaces 14*a* and 16*a* contacting in a lower-portion-abutting manner, a moment M is applied to the element 26 due to a friction force F acting on the lower portion of the element 26 from the pulley surfaces 14*a* and 16*a*, as shown in, e.g., FIG. 12, thereby causing pitching. This deteriorates the posture of the element 26. As a result, increase of noise and vibration, increase of abrasion of the element 26, and deterioration of driveline efficiency occur. Note that, although FIG. 12 illustrates a case in which a moment M in a rearward direction is applied to the element 26 and rearward pitching resultantly occurs, with respect to a friction force F in a reversed direction from that in FIG. 12 being applied to the lower portion of the element 26 from the pulley surfaces 14*a* and 16*a*, a moment M in a forward direction is applied to the element 26, thereby causing forward pitching.

Figure 13:
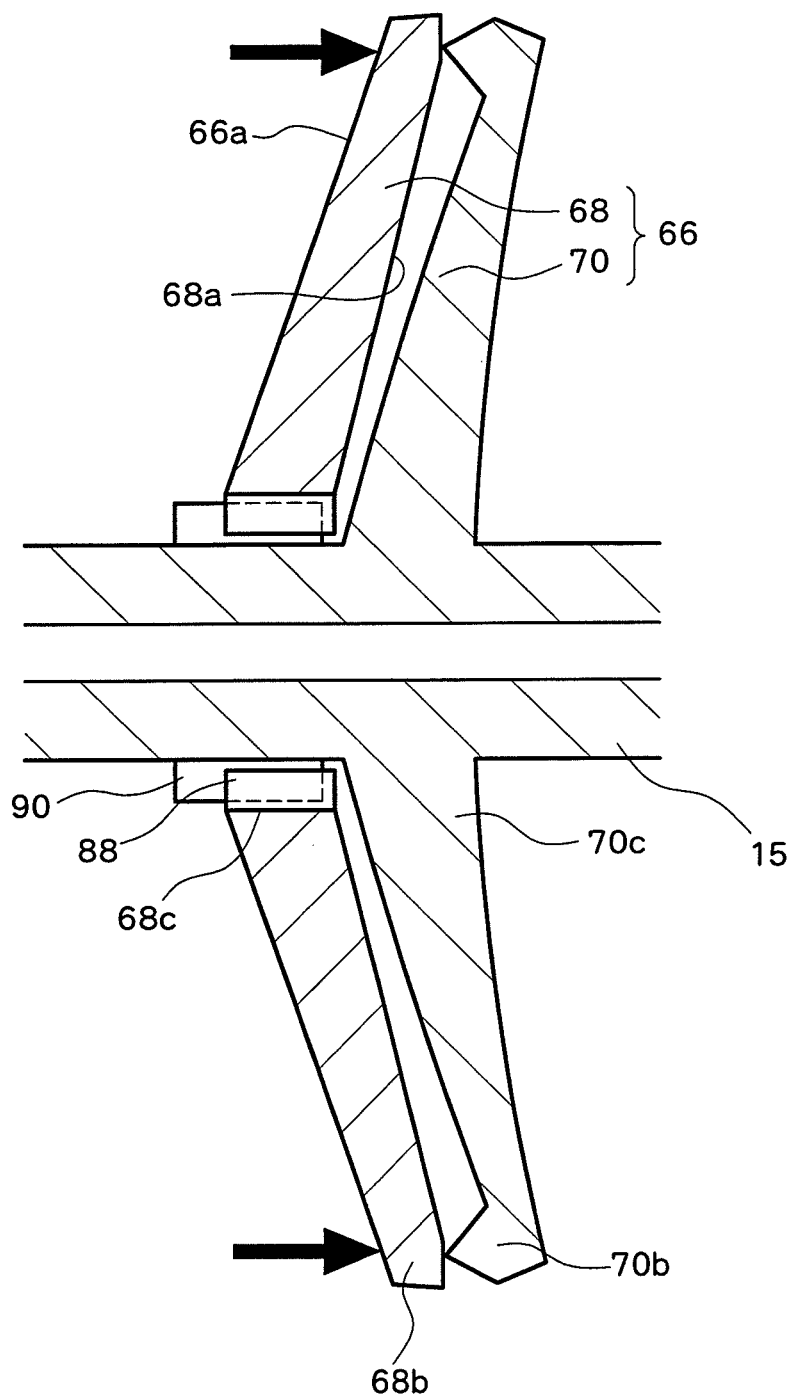
FIG. 13 is a diagram showing a stationary pulley 66 deformed with a load applied from the element 26 to an outside peripheral portion of a stationary pulley surface 66a in an embodiment of the present invention.
Figure 14:
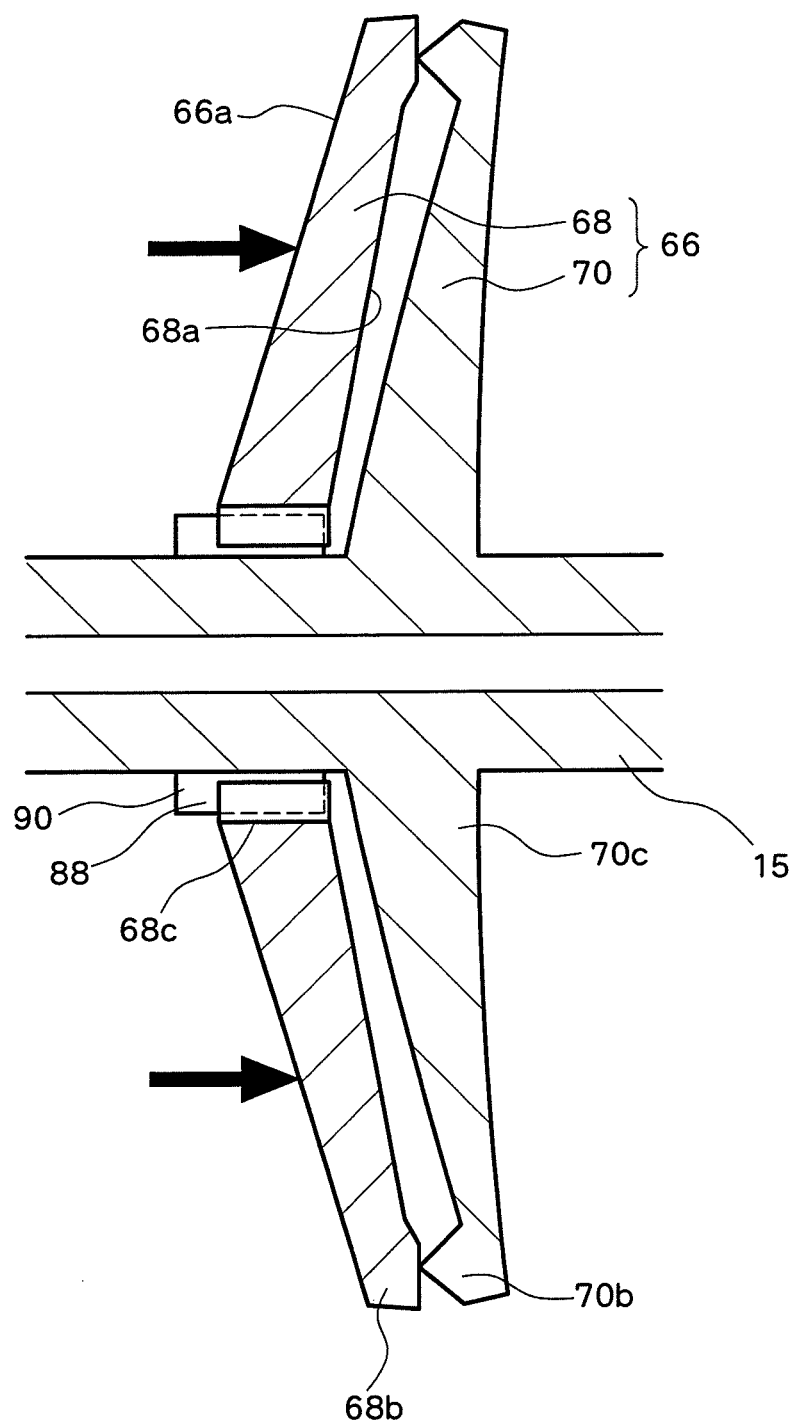
FIG. 14 is a diagram showing the stationary pulley 66 deformed with a load applied from the element 26 to a central portion of the stationary pulley surface 66a in an embodiment of the present invention.

Meanwhile, in this embodiment, as axial directional displacement of the inside peripheral portion 68*c* of the pressing pulley 68 is tolerated, the pressing pulley 68 is deformed, when holding the endless belt 12 (element 26) by pressing, in a manner similar to that in which a disk fixed in the outside peripheral portion 68*b* thereof is deformed, as shown in FIGS. 13 and 14. Here, FIG. 13 relates to a case in which the element 26 is in contact with an outside peripheral portion of the stationary pulley surface 66*a* and a load from the element 26 is applied to the outside peripheral portion of the stationary pulley surface 66*a*; and FIG. 14 relates to a case in which the element 26 is in contact with a central portion of the stationary pulley surface 66*a* and a load from the element 26 is applied to the central portion of the stationary pulley surface 66*a*. That is, axial directional displacement of the pressing pulley 68 (stationary pulley surface 66*a*) tends to be larger in the inside peripheral portion with a shorter radius and smaller in the outside peripheral portion with a longer radius, as shown in FIGS. 15 and 16.

Figure 15:
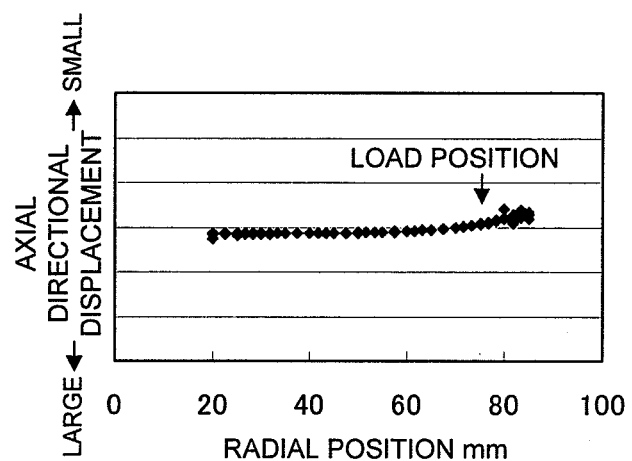
FIG. 15 is a diagram showing a calculation result of an axial directional displacement of the stationary pulley surface 66a when a load from the element 26 is applied to an outside peripheral portion of the stationary pulley surface 66a in an embodiment of the present invention.
Figure 16:
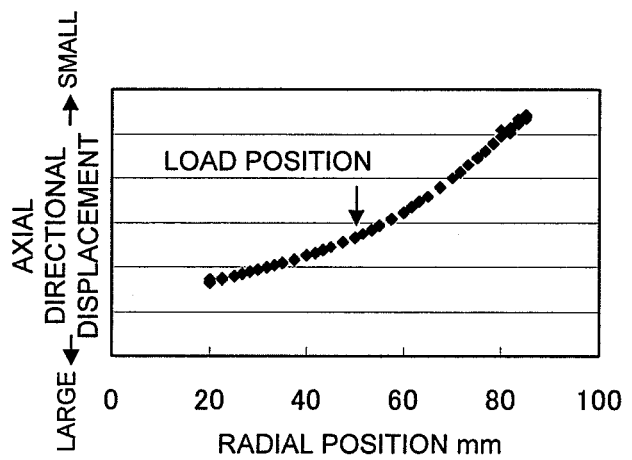
FIG. 16 is a diagram showing a calculation result of an axial directional displacement of the stationary pulley surface 66a when a load from the element 26 is applied to a central portion of the stationary pulley surface 66a in an embodiment of the present invention.
Figure 17:
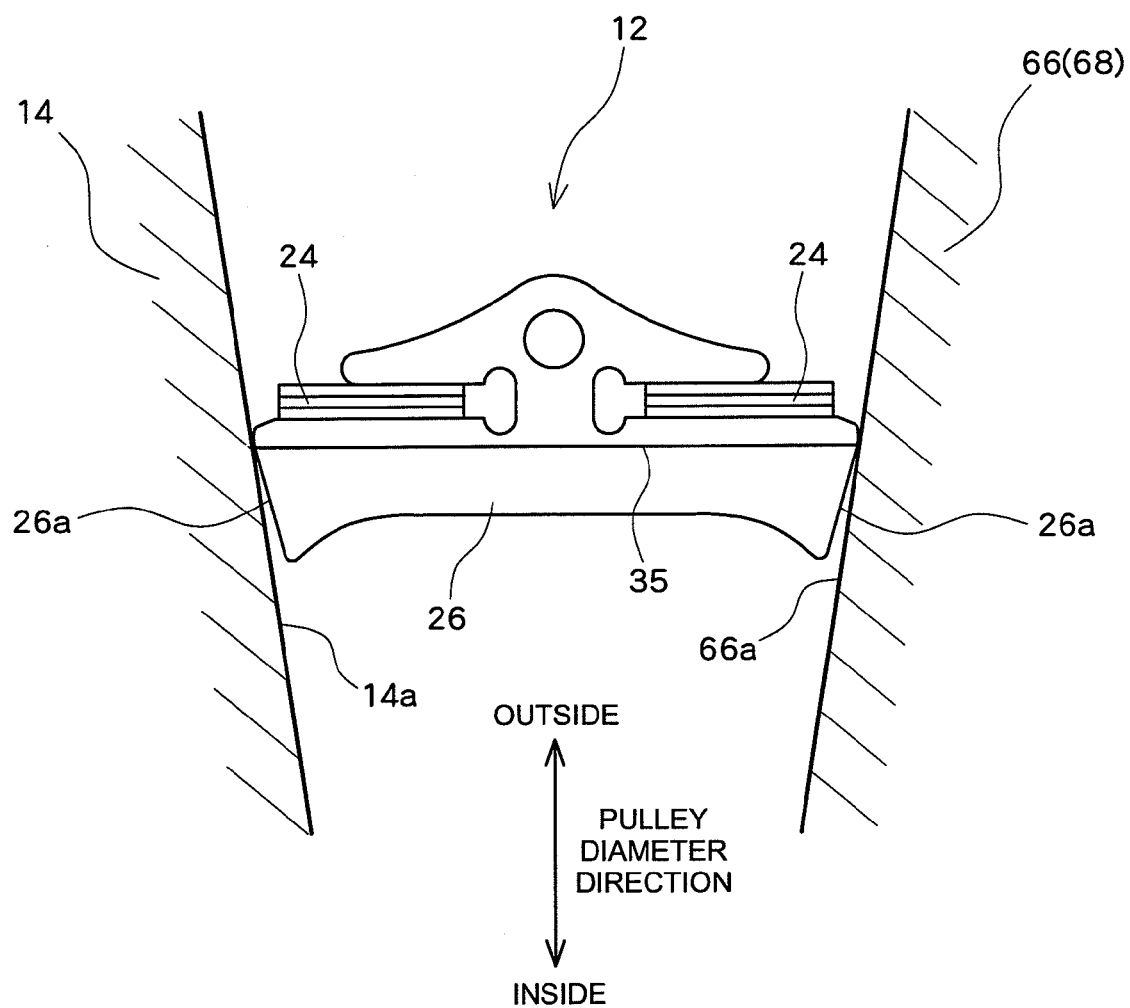
FIG. 17 is a diagram explaining the element 26 and the pulley surfaces 14a and 66a contacting in an upper-portion-abutting manner in an embodiment of the present invention.

Here, FIG. 15 shows a result of calculation of an axial directional displacement of the stationary pulley surface 66*a* when a load from the element 26 is applied to an outside peripheral portion of the stationary pulley surface 66*a*; and FIG. 16 shows a result of calculation of an axial directional displacement of the stationary pulley surface 66*a* when a load from the element 26 is applied to a central portion of the stationary pulley surface 66*a*. Thus, plane pressure between the side surface 26*a* of the element 26 and the respective pulley surfaces 14*a* and 66*a* tends to be lower inside in the diameter direction and higher outside in the diameter direction. That is, the element 26 contacts the pulley surfaces 14*a* and 66*a* in an upper-portion-abutting manner in which a portion outside in the pulley diameter direction contacts with greater force than does a portion inside in the pulley diameter direction, as shown in FIG. 17, so that the element 26 and the pulley surfaces 14*a* and 66*a* are prevented from contacting each other in a lower-portion-abutting manner.

As an upper portion (outside in the pulley diameter direction) of the element 26 is thicker in panel width and thus has stronger rigidity, as compared with a lower portion (inside in the pulley diameter direction), the element 26 and the pulley surfaces 14*a* and 66*a* contacting in an upper-portion-abutting manner can reduce an amount of deformation of the element 26. Further, as a friction force is applied to the upper portion of the element 26 from the pulley surfaces 14*a* and 16*a*, it is possible to restrain application to the element 26 of a moment in a rearward or forward direction, so that deterioration of the posture of the element 26 can be restrained. As a result, reduction of noise and vibration, reduction of abrasion of the element 26, and improvement of driveline efficiency can be attained.

In the following, other example structures of the stationary pulley 66 in this embodiment will be described.

Figure 18:
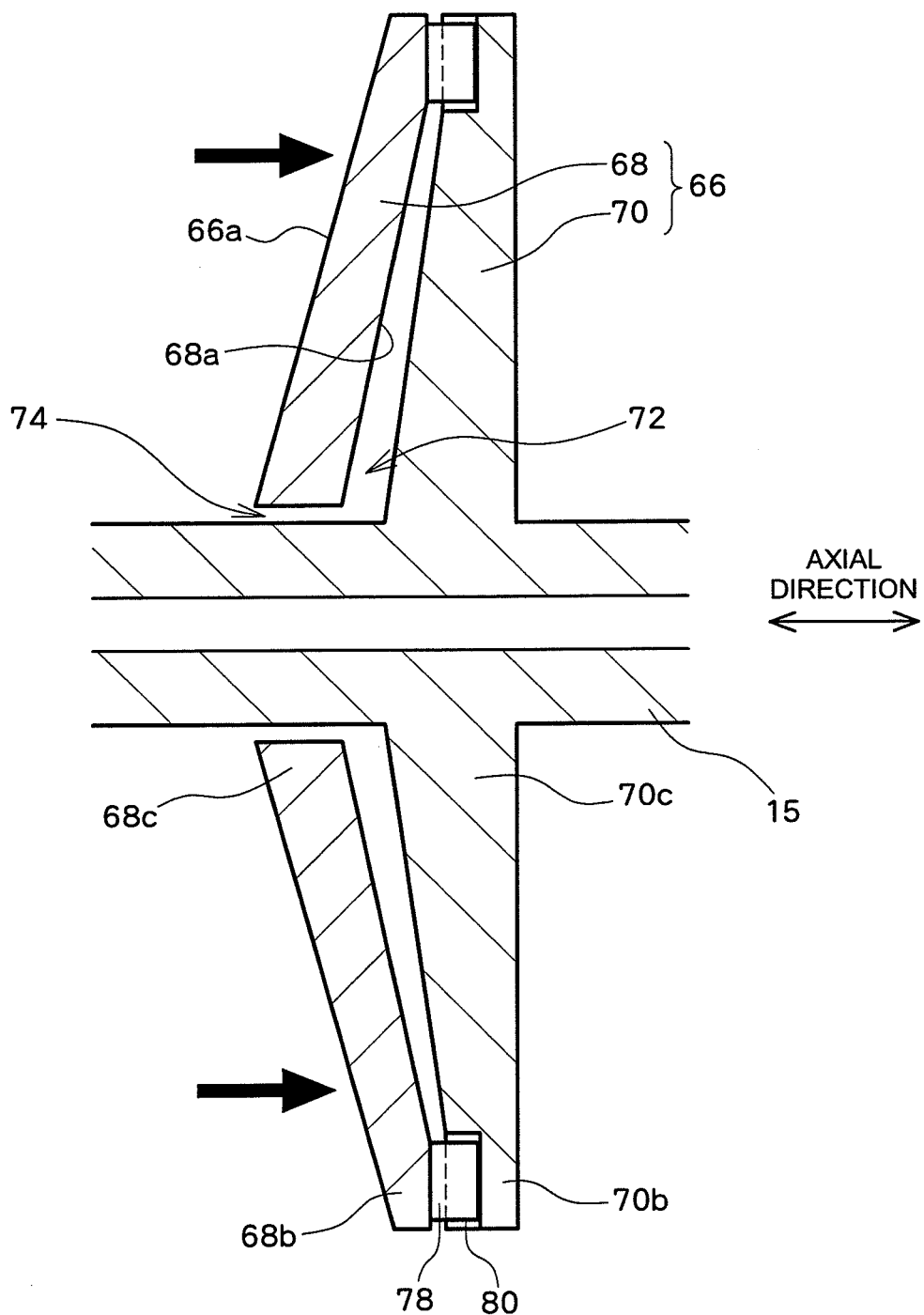
FIG. 18 is a diagram schematically showing another structure of a pulley of a belt-type stepless transmission according to an embodiment according to the present invention.

In the example structure shown in FIG. 18, a space 72 is formed between the inside peripheral portion 70*c* of the support pulley 70 and the inside peripheral portion 68*c* of the pressing pulley 68 (back surface 68*a*), and a space 74 is formed between the inside peripheral portion 70*c* of the support pulley 70 and the rotating shaft 15. That is, the rotating shaft 15 and the support pulley 70 do not restrain axial directional displacement of the inside peripheral portion 68*c* of the pressing pulley 68, and therefore the inside peripheral portion 68*c* of the pressing pulley 68 can move in the axial line direction relative to the rotating shaft 15.

In the example shown in FIG. 18, the space 72 is formed between the pressing pulley 68 and the support pulley 70 except between the outside peripheral portions 68*b* and 70*b*. Further, a tooth 78 is formed on the outside peripheral portion 68*b* of the pressing pulley 68 (back surface 68*a*) such that the tooth width direction thereof coincides (or substantially coincides) with the pulley diameter direction, projecting toward the outside peripheral portion 70*b* of the support pulley 70, while a tooth 80 is formed on the outside peripheral portion 70*b* of the support pulley 70 such that the tooth width direction thereof coincides (or substantially coincides) with the pulley diameter direction, projecting toward the outside peripheral portion 68*b* of the pressing pulley 68.

With the tooth 78 of the pressing pulley 68 and the tooth 80 of the support pulley 70 being meshed with each other, the outside peripheral portion 68*b* of the pressing pulley 68 is engaged with the outside peripheral portion 70b of the support pulley 70 in the rotational direction, whereby rotational directional displacement (relative displacement) of the outside peripheral portion 68b of the pressing pulley 68 relative to the support pulley 70 is restrained. This enables transmission of a torque between the pressing pulley 68 and the support pulley 70, so that the pressing pulley 68 and the support pulley 70 can rotate integrally with the rotating shaft 15. As described above, the mutually meshed (engaged) teeth 78 and 80 function as a torque-transmitting mechanism (engaging mechanism).

Figure 19:
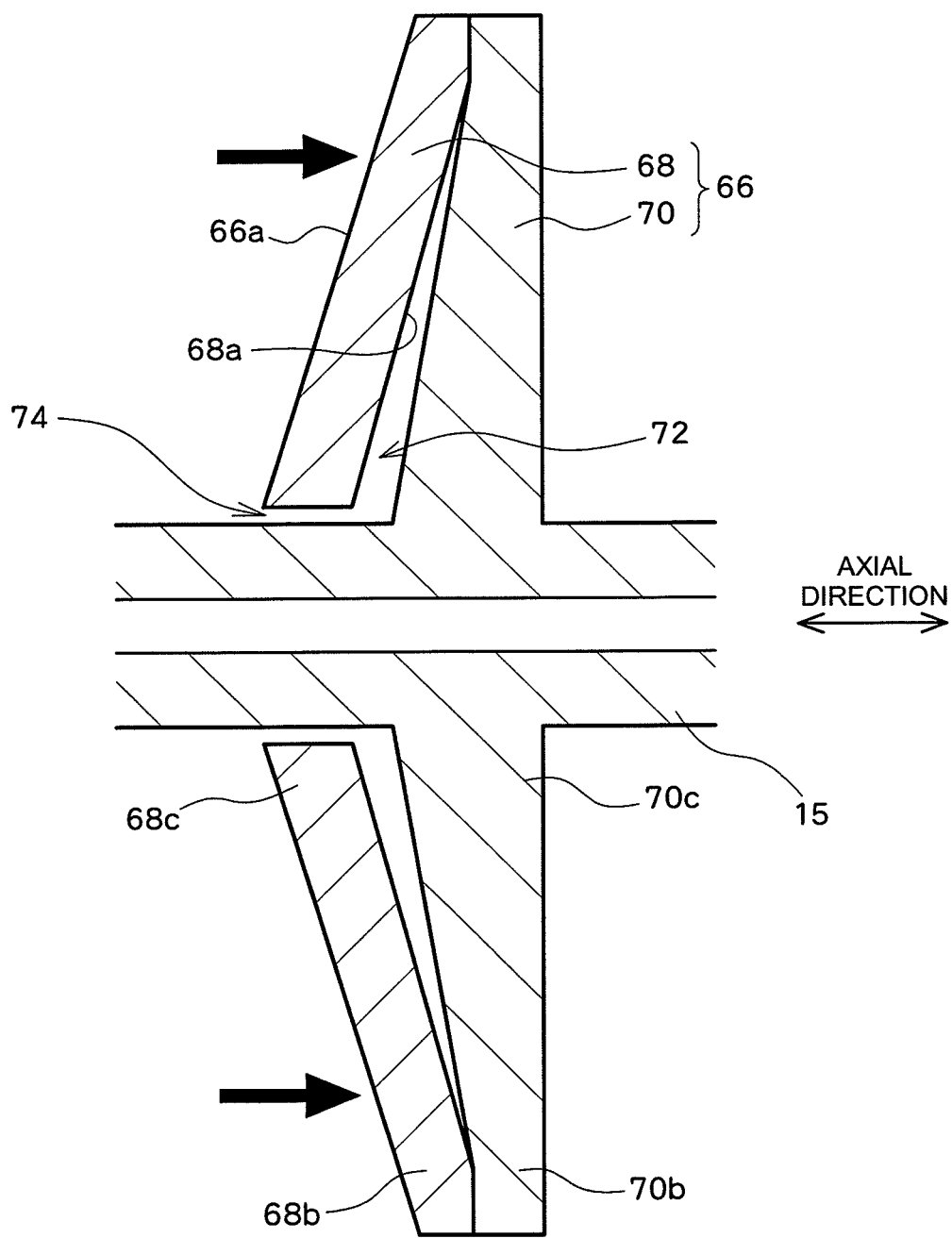
FIG. 19 is a diagram schematically showing another structure of a pulley of a belt-type stepless transmission according to an embodiment according to the present invention.

In the example structure shown in FIG. 19, the outside peripheral portion 68b of the pressing pulley 68 is attached to the outside peripheral portion 70b of the support pulley 70, different from the example structure shown in FIG. 18. This enables transmission of a torque between the pressing pulley 68 and the support pulley 70, so that the pressing pulley 68 and the support pulley 70 can rotate integrally with the rotating shaft 15.

Also in the example structures shown in FIGS. 18 and 19, as axial directional displacement of the inside peripheral portion 68c of the pressing pulley 68 is tolerated, axial directional displacement of the pressing pulley 68 (stationary pulley surface 66a), when holding the endless belt 12 (element 26) by pressing, tends to be larger in an inside peripheral portion with a shorter radius and smaller in an outside peripheral portion with a longer radius. Thus, the element 26 contacts the pulley surfaces 14a and 66a in an upper-portion-abutting manner, preventing the element from contacting the pulley surfaces 14a and 66a in a lower-portion-abutting manner.

Note that, also in the example structures shown in FIGS. 18 and 19, the spline 88 can be provided to the inside peripheral portion 68c of the pressing pulley 68 and the spline 90 can be provided to the outside peripheral portion of the rotating shaft 15 so that the splines 88 and 90 are meshed with each other.

Although embodiments for practicing the present invention are described above, the present invention is not limited to the above described embodiments, and obviously can be modified in various other manners within a range not departing from the gist of the present invention. For example, the number of endless bands 24 being stacked is not limited to three layers, as shown, but may be six or nine layers in accordance with necessity.

The invention claimed is:

1. A pulley of a belt-type stepless transmission, comprising:
   a stationary pulley having a stationary cone surface and a rotating shaft fixed at a central portion thereof;
   a movable pulley being movable in an axial direction of the rotating shaft and having a movable cone surface disposed facing the stationary cone surface in the axial direction; and
   a belt held between, while being pressed by, the stationary cone surface and the movable cone surface,
   wherein
   the stationary pulley includes
   a pressing pulley having the stationary cone surface, and
   a support pulley disposed facing the movable cone surface with the pressing pulley therebetween in the axial direction, for supporting the pressing pulley, in which the rotating shaft is fixed at a central portion thereof,
   the support pulley supports an outside peripheral portion of the pressing pulley so as to restrain axial directional displacement of the outside peripheral portion of the pressing pulley,
   a space is formed between the pressing pulley and the support pulley except between the outside peripheral portion of the pressing pulley and an outside peripheral portion of the support pulley, and
   the pressing pulley has an inside peripheral portion capable of moving in the axial direction relative to the rotating shaft and transmitting a torque to any one or more of the rotating shaft and the support pulley; and
   a first torque-transmitting mechanism for restraining rotational directional displacement of the inside peripheral portion of the pressing pulley relative to the rotating shaft, while tolerating axial directional displacement of the inside peripheral portion of the pressing pulley relative to the rotating shaft, to transmit a torque between the pressing pulley and the rotating shaft,
   wherein a slidable spline is provided on the inside peripheral portion of the pressing pulley and a spline is provided on the outside peripheral portion of the rotating shaft, the spline of the pressing pulley and the spline of the rotating shaft being engaged with each other in the rotational direction so as to transmit the torque.

2. The pulley of the belt-type stepless transmission according to claim 1, wherein a space is formed between the inside peripheral portion of the pressing pulley and the rotating shaft.

3. The pulley of the belt-type stepless transmission according to claim 1, further comprising a second torque-transmitting mechanism for restraining rotational directional displacement of the outside peripheral portion of the pressing pulley relative to the support pulley to transmit a torque between the pressing pulley and the support pulley.

4. The pulley of the belt-type stepless transmission according to claim 1, wherein the outside peripheral portion of the pressing pulley is attached to the support pulley.

5. A belt-type stepless transmission comprising a belt wound around a pulley, wherein the pulley is the pulley according to claim 1.

* * * * *